Figure 1:
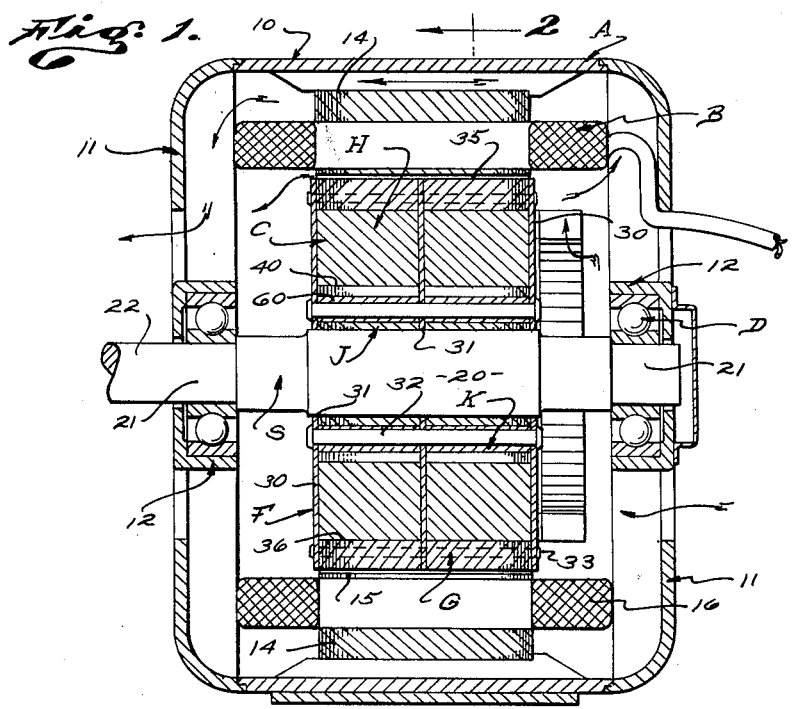

June 8, 1954  M. W. BRAINARD  2,680,822
ROTOR FOR DYNAMOELECTRIC MACHINES
Filed June 25, 1951  3 Sheets-Sheet 1

INVENTOR.
Maurice W. Brainard
BY
Attorney

June 8, 1954  M. W. BRAINARD  2,680,822
ROTOR FOR DYNAMOELECTRIC MACHINES
Filed June 25, 1951  3 Sheets-Sheet 2

INVENTOR.
Maurice W. Brainard
BY
Attorney

June 8, 1954 M. W. BRAINARD 2,680,822
ROTOR FOR DYNAMOELECTRIC MACHINES
Filed June 25, 1951 3 Sheets-Sheet 3
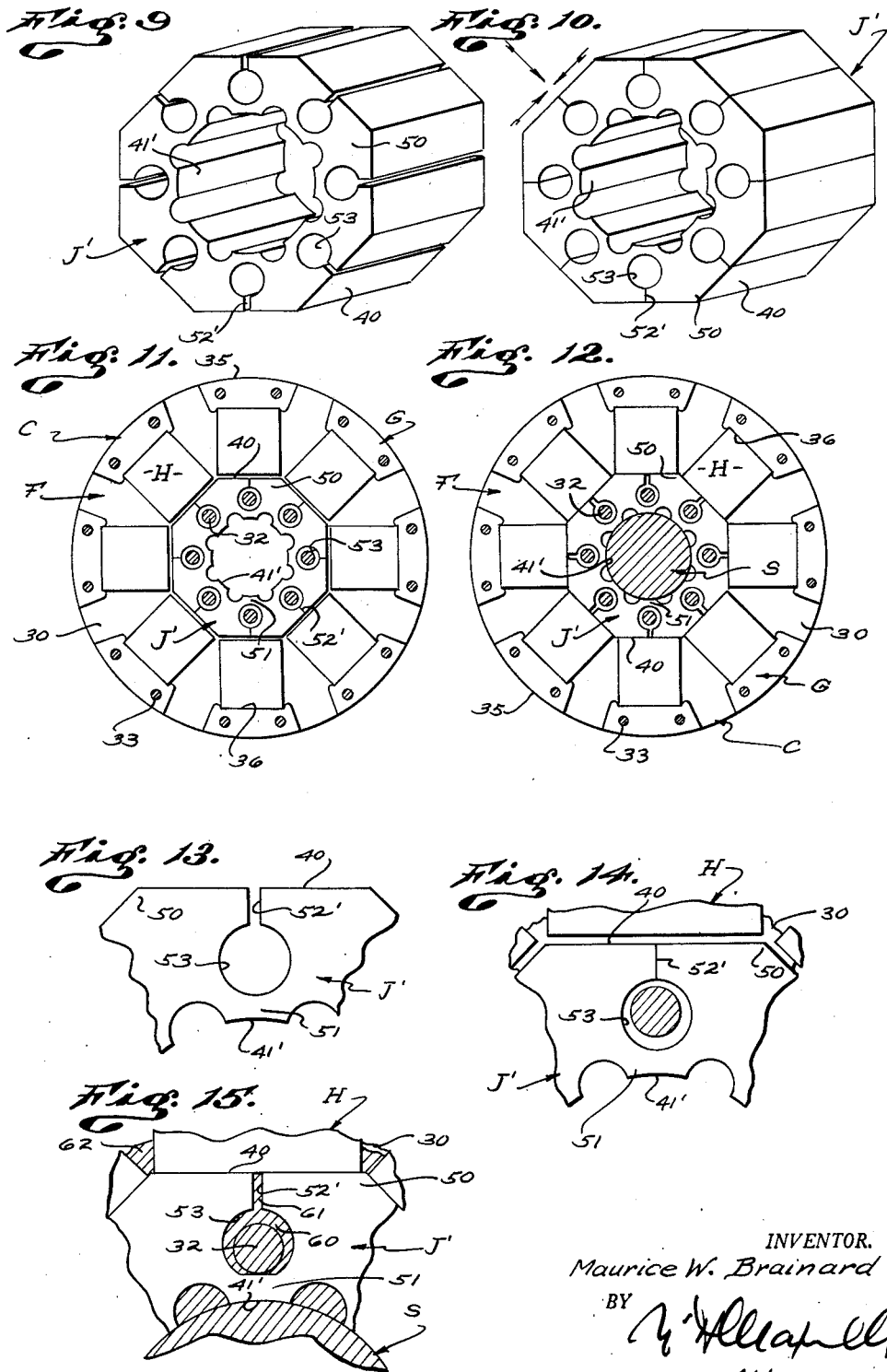
INVENTOR.
Maurice W. Brainard
BY
Attorney Patented June 8, 1954

2,680,822

UNITED STATES PATENT OFFICE 2,680,822

ROTOR FOR DYNAMOELECTRIC MACHINES

Maurice W. Brainard, Los Angeles, Calif., assignor of one-half to O'Keefe & Merritt Company, Los Angeles, Calif., a corporation of California Application June 25, 1951, Serial No. 233,421

13 Claims. (Cl. 310—261)

This invention has to do with a rotor and method of making the same, and more specifically it is concerned with a rotor for an electric machine, for instance, where magnets or other such elements are involved and are required to be organized in a stable assembly subject to rotation. It is a general object of this invention to provide a simple, practical, and effective rotor construction and to provide a simple, practical, easily executed method of making such a construction.

Rotors such as are employed in electric machines, as where magnets or other elements are required to be carried in an assembly which is to be rotated, present certain structural problems and it is highly desirable, in practice, to provide such a structure having the desired elements or magnets assembled in a rigid, permanent structure, together with pole pieces or other parts, so that there is no play or working between the parts or elements and so that the electrical or magnetic action involved is handled efficiently.

It is a general object of this invention to provide a rotor of the general character referred to, for example, a rotor for an electric machine wherein magnets, pole pieces, and other parts, are assembled into a permanent, rigid unit, and wherein the desired pressure engagement is established between the parts by forced deformation of an element.

It is another object of the invention to provide a rotor of the general character referred to wherein the element deformed to establish the desired tight relationship of parts is in the nature of a sleeve or core at the center of the rotor, and this core is such that it may serve as the means by which a supporting shaft is held.

It is another object of this invention to provide a rotor of the general character referred to in which the element deformed to gain the desired tight relationship of parts is in the nature of a core held positively in the desired deformed condition by the shaft that supports the rotor in the machine.

It is another object of the invention to provide a deformable core for a rotor of the general character referred to, which core is of simple, inexpensive construction and such that it can be readily deformed in the desired manner, and which may serve as the mounting element by which the rotor is carried on a shaft.

Another object of the invention is to provide a method for the making of a rotor of the general character referred to which method is characterized by the deformation of an element of the rotor in the course of assembly of the parts, to the end that the deformed element maintains the general assembly tight or with the various parts in pressure engagement with each other.

It is another object of this invention to provide a method of the general character referred to which is exceedingly simple in execution and which can be carried out without employing complicated or special equipment and without resorting to operations likely to in any way damage or impair the parts involved.

The invention can be used to advantage in rotors for electrical machines, and therefore, I will make specific reference to forms or embodiments of the invention wherein parts are concerned which assemble to form the rotor of a generator. In setting forth the invention I will refer to the rotor as involving permanent magnets which are combined with pole pieces suitable for cooperation with a fixed annular armature, or the like.

In a typical machine employing the rotor there may be a case carrying an annular fixed armature and having end caps carrying bearings which support a shaft centrally of the armature. The shaft may be considered as a part of the rotor and has a middle portion which is straight and turned and on that portion of the shaft there is a frame that may be formed of a plurality of rigid, flat plates, spaced apart axially of the machine. The plates of the frame may be tied together by tie rods, and there may be inner tie rods connecting the plates near the shaft, and outer tie rods extending between the peripheral portions of the plates. Peripheral pole pieces are carried by the frame between the peripheral portions of the plates of the frame, and they are spaced circumferentially of the rotor in an annular series concentric with the shaft. The outer peripheries of the pole pieces may be curved concentric with the shaft while the inner parts of the pole pieces are formed to present channels that face inwardly or toward the shaft. The outer tie rods of the frame extend snugly through the outer pole pieces and, as a result, the pole pieces are clamped tight between the plates of the frame to become solid or rigid with the frame.

A plurality of magnets is incorporated in the rotor and are rectangular in cross section and there is one located immediately inward of each of the outer pole pieces, the magnets being engaged or seated in the channels of the pole pieces. The magnets project inward from the outer pole pieces and their inner portions cooperate to define a polygonal central opening that carries a core supported by the shaft. The core is a continuous annular element substantially coextensive with the magnets and it may be either solid or laminated. The core has outer faces that fit against the inner sides of the magnets and has shaft seats engaging the exterior of the straight turned portion of the shaft. Openings extend inwardly in the core from the magnet seats and, in effect, divide the core into corner portions which form magnetic ties between adjacent magnets and connections that extend between and connect adjacent corner portions. The openings that thus characterize the core may have enlarged round portions that freely pass the inner tie rods of the frame and which form the connecting portions so that they are arcuate or bridge-like.

The core is initially formed so that the shaft receiving opening is somewhat smaller in diameter than the exterior of the straight turned portion of the shaft. In a typical case the shaft is initially formed with the straight turned portion of a given diameter and adjacent one end thereof there is a tapered part. The frame is initially assembled with the outer core pieces tightly in place and the magnets are arranged against the inner sides of the outer pole pieces, following which the core is inserted in the opening defined by the magnets, the core being formed so that in its initial condition it will insert easily into the opening formed by the magnets. The tapered end portion of the shaft is then inserted into the core and forced through it, as the core as a whole is expanded, the connecting portions of the core being deformed or pressed outwardly by the wedging action of the tapered part of the shaft. The expansion or outward deformation of the core is such as to enlarge the core generally causing the magnet seats of the core to be pressed tightly against the magnets so that the magnets in turn are pressed tightly against the outer core pieces, which are held fixed by the frame. The insertion of the shaft is continued until the straight turned portion occurs within the core and extends throughout the length of the core, making the core tight or solid on the shaft as well as tight in the assembly of magnets held by the assembly of outer pole pieces.

The major deformation occurs in the core to allow for the desired expansion thereof at the connecting portions between the corner portions. The corner portions wedge tight into the magnet assembly with the magnet seats of the core tight against the inner ends of the magnets. When the principal parts have been assembled, any openings or interstices occurring in the structure, as between magnets, pole pieces, or the unoccupied openings between the core, are filled with a suitable filler, as by a pressing or casting operation, to the end that the finished rotor is solid and without cavities.

Figure 2:
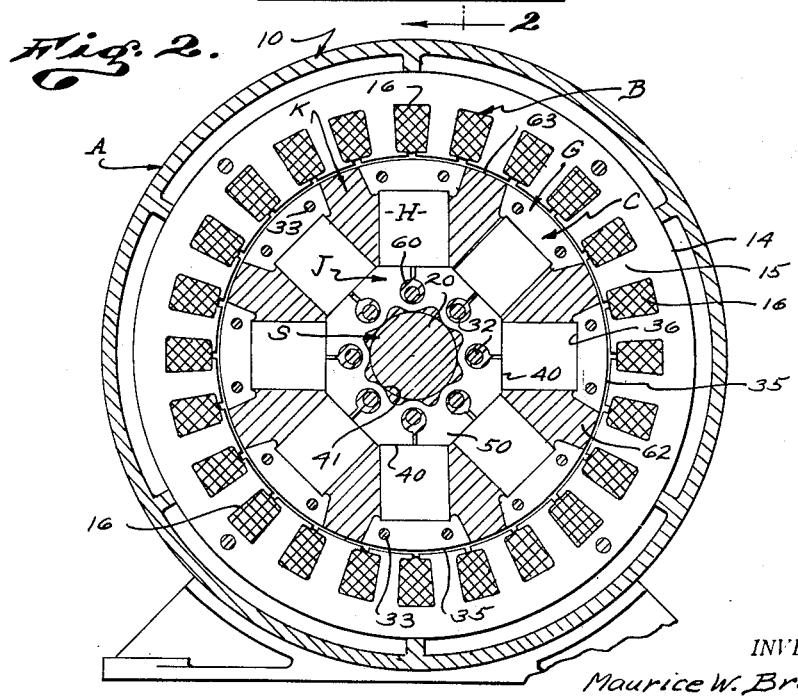
Figure 3:
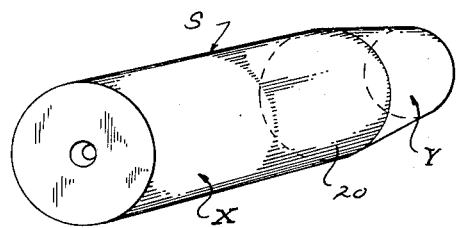
Figure 4:
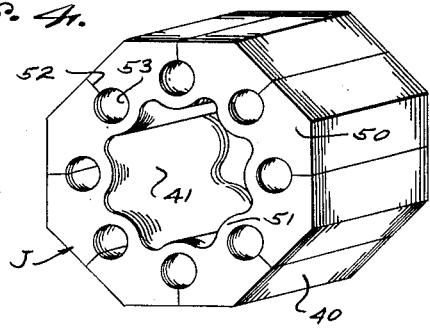
Figure 5:
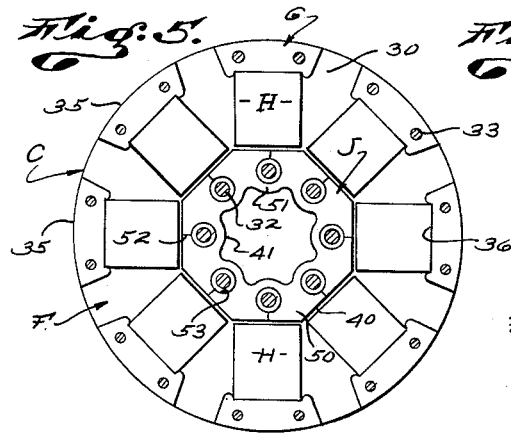
Figure 6:
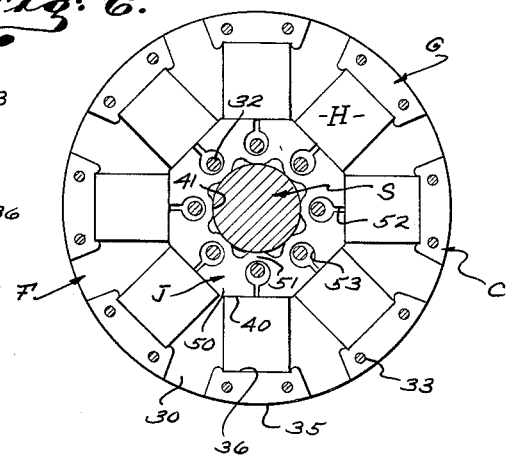
Figure 7:
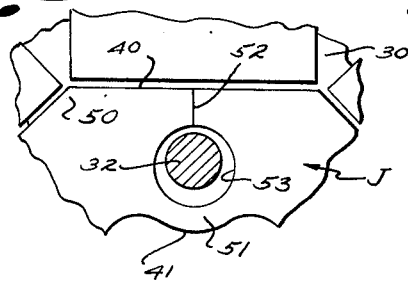
Figure 8:
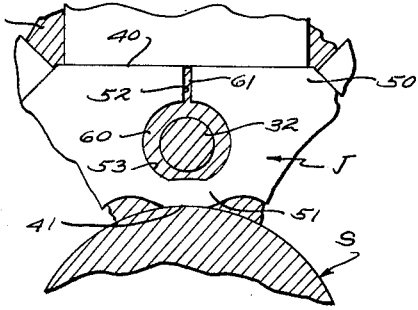

The various objects and features of my invention will be fully understood from the following detailed description of typical preferred forms and applications of the invention, throughout which description reference is made to the accompanying drawings, in which:

Fig. 1 is a longitudinal sectional view of a rotary machine such as a permanent magnet generator, in which the rotor of the machine characterized by an annular assembly of permanent magnets employs the construction provided by the present invention. Fig. 2 is a detailed transverse sectional view of the machine shown in Fig. 1, being a view taken as indicated by line 2—2 on Fig. 1. Fig. 3 is a perspective view of the shaft employed in the machine or in the rotor of the machine, showing it in the condition or form in which it may be employed for the deformation of the core, as provided by the present invention. Fig. 4 is a perspective view of the expansible core of the rotor, as provided by the present invention, showing a form thereof which is of laminated construction. Fig. 5 is a detailed transverse sectional view of parts of the rotor assembled ready for reception of the shaft, the core being shown in place within the assembly of magnets and before it has been expanded or deformed. Fig. 6 is a view similar to Fig. 5, showing the shaft in place after the core has been expanded and with the shaft maintaining the core in the expanded condition. Fig. 7 is an enlarged view of a portion of Fig. 5. Fig. 8 is an enlarged view of a portion of Fig. 6. Figs. 9 to 15, inclusive, illustrate another form of construction wherein the core is formed of a solid body of material or metal. Fig. 9 illustrates the core in an initial form, for instance a form in which it occurs following its initial formation. Fig. 10 is a perspective view of the core shown in Fig. 9, showing it collapsed or having been pressed into a collapsed condition. Fig. 11 is a transverse sectional view of a rotor showing the collapsed core illustrated in Fig. 10 in place in the opening defined by the annular assembly of magnets. Fig. 12 is a view similar to Fig. 11 showing a shaft in the expanded core. Fig. 13 is an enlarged view of a portion of Fig. 9. Fig. 14 is an enlarged view of a portion of Fig. 11, and Fig. 15 is an enlarged view of a portion of Fig. 12.

The particular electric machine illustrated in the drawings is a generator and it is shown as involving a case A, a fixed or stationary armature B in the case, and a rotor C operating within the armature B and carried by or including a shaft S carried by bearings D supported by the case. Since the present invention is in no way concerned with the generalities of the electric machine, but rather, is concerned with the rotor and its manufacture, a simple machine construction is illustrated and will serve merely as an example of a typical machine construction in which the invention can be used.

The case A illustrated in the drawings involves a main central part or body 10 which is a rigid annular element, and end caps 11 secured to or carried by the ends of the body 10 and having central portions 12 which carry the bearings D.

The armature is shown carried by the body 10 of the case and is illustrated as involving a laminated core assembly 14 having inwardly projecting teeth 15 defining slots in which suitable coils or windings 16 are located. The various elements or parts of the armature form an annular assembly concentric with the shaft S.

The shaft S shown in its finished form in Fig. 1 of the drawings involves a central portion 20 which is straight and round in cross-section. End portions 21 project from the ends of the central portion 20 and are carried by the bearings D supported by the end caps 11 of the case. In the particular case illustrated the end portions 21 are turned down or of reduced diameter, and the bearings D are shown as anti-friction bearings suitably supported in the central portions 12 of the end caps 11. It is to be understood, of course, that the shaft may have an extension 22, for instance, a part projecting from one of the end parts 21 projecting from the exterior of the machine.

The rotor, as provided in the present invention may be considered as mounted on or as including the shaft S, and it includes, generally, a frame F, outer pole pieces G, magnets H, a core J, and it further preferably includes a filler K.

The frame F is a rigid structure or assembly, preferably carried directly on the shaft S. In the particular case illustrated the frame is shown as involving a plurality of plates 30 which are flat, disposed in planes normal to the longitudinal axis of the shaft, and spaced apart axially of the shaft. The plates are shown as provided with central openings 31 that snugly receive the central portion 20 of the shaft S. The number of plates involved in the rotor will depend upon the type of construction employed; for instance, if the rotor involves but a single annular group of magnets, outer pole pieces, and a single laminated core assembly, there need be only two plates 30, whereas in a multiple construction such as is shown in the drawings and where there is more than one annular series of magnets, and more than one annular series of outer pole pieces and more than one core, there are plates provided so that there is a plate between each annular series of elements involved in the rotor as well as a plate in each end of the assembly.

The frame includes, in addition to the plates 30 tie rods which join or connect the plates, and in the case illustrated there are inner tie rods 32 that connect the plates 30 adjacent the shaft, and outer tie rods 33 that connect the outer or peripheral portions of the plates as where the plates carry the outer pole pieces G. In practice a suitable number of tie rods is employed to gain the desired strength and rigidity, and the tie rods are suitably secured or anchored to the plates involved in the frame. In the particular case illustrated there are more outer tie rods than inner tie rods, and the outer tie rods are somewhat lighter in construction than the inner tie rods.

The outer pole pieces G occur or are carried between the plates 30 of the frame and are spaced apart circumferentially to form an annular series of pole pieces at the periphery of the rotor, adjacent pole pieces G being spaced apart as clearly shown in Fig. 2 of the drawings. In the preferred construction the outer pole pieces G are secured and anchored in the frame by outer tie rods 33 of the frame. As shown in the drawings it is preferred that each outer pole piece G be held by a plurality of outer tie rods 33 so that the outer pole pieces are solidly anchored to or in the frame making the assembly formed by the frame and outer pole pieces a solid, rigid structure that is rigid on the shaft S.

In accordance with the invention it is preferred that the pole pieces G have their outer peripheries 35 curved concentric with the shaft S and each pole piece G is provided at its inner side with an inwardly facing channel 36, and the channels 36 are preferably disposed so that they extend axially of the rotor.

The magnets H illustrated in the drawings are, for purpose of simplicity, illustrated as permanent magnets, and are shown as being rectangular in cross-sectional configuration, and each has its outer end portion seated in a channel 36 of a pole piece G, as clearly illustrated in Fig. 2 of the drawings. There is a magnet H for each pole piece G, and as a result of this relationship of parts the magnets form an annular assembly or series. The innermost or end portions of the magnets H closely approach each other, so that the annular series of magnets in effect forms a polygonal opening concentric with the shaft S and accommodating the core J.

In the preferred construction the magnets H are coextensive with the pole pieces G axially of the rotor, and they are confined against axial movement or shifting by the plates 30 of the frame. The core J, as provided by the present invention, is an annular or sleeve-like element surrounding the middle or central portion 20 of the shaft and located in the polygonal opening defined by the annular series of magnets H. In accordance with the invention the core is provided at its exterior with outwardly facing magnet seats 40 and at its interior with inwardly facing shaft seats 41. The magnet seats 40 are formed or shaped to correspond to the inner ends of the magnets H so that they have effective seating or bearing engagement with the magnets and they are preferably continuous from one end of the core to the other, so that the magnets are engaged continuously from one end to the other. The shaft seats 41 face inwardly or toward the central portion 20 of the shaft and, in practice, they may be varied in form or shape. For example, as shown in the core illustrated on sheet 2 of the drawings, they are curved to have, in effect, line engagement with a part initially inserted in the core, whereas in the core illustrated on sheet 3 of the drawings, they are shaped to extend around the axis of the rotor concentric with the shaft to have initial engagement with a member inserted in the core circumferentially of the core, as well as longitudinally thereof.

A feature of the core provided by the present invention is its continuous annular construction, it being preferred that it be constructed so that it is continuous annularly, at the same time being expansible.

In the preferred form of core construction openings extend inwardly in the core from its exterior, preferably from the centers of the magnet seats 40, and these openings extend a substantial distance inwardly and terminate shortly before reaching the interior of the core where the shaft seats occur. Through this construction the core is divided into corner portions 50, each of which has contact with two magnets, and connecting portions 51 which extend between and connect the corner portions at the interior of the core. In the preferred construction the inwardly extending openings have outer portions 52 which are straight and radially disposed relative to the axis of the rotor, and have inner portions 53 which are round and of substantial size, and are so related to the interior of the core where the shaft seats 41 occur as to establish the connecting portions 51 as elongate bands which are, in effect, arcuate or arch-like in formation, as clearly illustrated in the drawings. The straight openings 52 are preferably narrow or mere slit-like openings, whereas the round portions 53 are preferably of such size as to accommodate or pass the inner tie rods 32 of the frame with substantial clearance, as shown throughout the drawings.

In the form of the invention illustrated in Figs. 4 to 8, inclusive, the core is of laminated construction, that is, it is made up of a plurality of superimposed plates each of which is a continuous annular element, and the assembly of plates is of such extent axially of the rotor as to be substantially coextensive with the magnet assembly and it is held between the inner portions of the plates 30 which are tied together by the inner tie rods 32 and 33. In carrying out the invention it is preferred to form the core or the plates of the core of metal, for instance, of a steel, that is subject to being deformed but is possessed of a reasonable degree of resilience.

In accordance with the invention the core J formed as above described, and as shown throughout the drawings, is inserted in the assembly made up of the frame, outer core pieces, and magnets, with the core in a form in which the annular series of shaft seats 41 at the interior thereof establishes an opening of a diameter somewhat smaller than the middle portion 20 of the shaft S.

In a typical manner of carrying out the invention the shaft may be initially employed in a form such as is shown in Fig. 3, where it has the central portion 20 turned or otherwise finished, so that it is straight and round in cross section and of the desired size, while it has one end X plain and unfinished and the other end Y extending from the portion 20 and tapered or convergent, as shown in Fig. 3. The tapered end Y of the shaft element such as is shown in Fig. 3, is inserted in the core and forced through the core from one end thereof, with the result that it engages the core seats 41 and forces these parts or the connecting portions 51 outwardly, causing general expansion of the core, and its deformation from the form illustrated in Figs. 5 and 7 to that illustrated in Figs. 6 and 8. It will be readily apparent that by suitably relating the shaft and core, or by providing a suitable initial relationship between these elements, a deformation is effected by insertion of the shaft which causes forced expansion or deformation of the core in a manner to expand the core outwardly in the annular assembly of magnets, with consequent outward forcing or pressing of the magnets against the fixed outer pole pieces G.

In the particular case illustrated on sheet 2 of the drawings the deformation or expansion of the core may result in varying the form of the connecting portions 51 so that the shaft seats 40, which are initially convex faces facing the shaft, are finally concave, as shown in Fig. 8. In the case of a laminated core the wedging or deformation that occurs as the shaft is inserted with cause each individual lamination to be expanded or deformed, with consequent individual fitting thereof to the shaft. When the shaft, as shown in Fig. 3, is fully inserted, that is, when the straight turned portion 20 is brought completely within the core, the end portions X and Y project beyond the ends of the core and are accessible so that they can be readily dressed or turned to give the shaft a final form such as is illustrated in Fig. 1 of the drawings. As an alternate method, the expansion may be done by a special tool followed by insertion of the shaft.

In carrying out the invention it is preferred to form the frame parts and at least the plates 30 of the frame of non-magnetic material such, for example, as a metal that is non-magnetic, and it will be understood that with the core construction that I have provided the corner portions 50 of the core occur in the rotor so that each corner portion is in contact with two adjacent magnets and, consequently, forms an effective magnetic tie between such magnets. It is to be understood, of course, that the core that I have provided is formed of a material effective as a conductor of magnetism so that the magnetic tying action of the corner portions of the core is highly efficient.

It is preferred, in practice, that a rotor constructed as hereinabove described, be provided with a filler K before it is put into use. The filler may be a suitable non-magnetic material such as a soft metal cast or otherwise applied to the assembly forming the core so that all of the openings or interstices that would otherwise be open are filled or fully occupied. In the particular case illustrated portions 60 of the filler K occur in the round openings 53 provided in the core, portions 61 of the filler occur in the narrow slits formed by the opening portions 52, and portions 62 occur between adjacent magnets and adjacent outer pole pieces G and have their outer edges 63 finished to be concentric with the curved outer edges 35 of the pole pieces G.

On sheet 3 of the drawings I illustrate a core construction incorporating the invention wherein the core, instead of being of laminated construction, is solid or formed of a single solid or unitary block of metal. In this particular case the core J' is initially formed so that the shaft seats 41' are concave and initially conform to the exterior of the shaft portion 20. To facilitate manufacture the straight portions 52' of the openings in the core extending inwardly from the magnet seats 40 are in the form of open slots such as can be readily formed by a machine tool, and as thus formed and as shown in Fig. 1, the core is of such size that it would not enter the assembly of magnets included in the rotor.

The first operation performed on this core is deformation and involves collapsing of the core to a form such as is shown in Fig. 10, where the open slots 52' are reduced to mere cracks, with the result that the core is reduced in over-all size so that it will enter the assembly of magnets, as shown in Fig. 11, the core can be expanded, as shown in Fig. 12, by insertion of a shaft as shown in Fig. 15, and as hereinabove described, with the result that the core as a whole is expanded and deformed, bringing the magnet seats into pressure engagement with the magnets and the magnets into pressure engagement with the outer pole pieces. In this case the core can be proportioned so that the expansion which causes it to exert the desired pressure in the rotor need not bring it back to its original size, as shown in Fig. 9.

It will be understood and it is believed that it will be appreciated from the drawings, that by suitable proportioning of the parts of the core, and particularly the bridge-like connecting portions 51 of the core, an expansion and deformation can be brought about in the core by the insertion of the shaft which results in a rotor that is in the form of a unit having the several parts permanently and rigidly assembled and in pressure engagement with each other, so that the rotor can, in practice, be operated at high speeds under severe conditions and over long periods of time without any danger whatsoever of parts working loose or shifting within the rotor.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A rotor including, a shaft, a frame on the shaft projecting radially therefrom, pole pieces at the outer peripheral portion of the frame and fixed thereto, a plurality of magnets in an annular series and seated outwardly against the pole pieces, and a continuous annular expansible core tight on the shaft and held expanded thereby and seated outwardly against and in pressure engagement with said magnets.

2. A rotor including, a shaft, a frame on the shaft projecting radially therefrom, pole pieces at the outer peripheral portion of the frame and fixed relative thereto, a plurality of magnets in an annular series and seated outwardly against the pole pieces, and a continuous annular expansible core tight on the shaft and seated outwardly against said magnets in pressure engagement therewith, the core having circumferentially spaced portions at its outer periphery each bearing outwardly against two adjacent magnets and having circumferentially spaced shaft seats at its inner periphery and bearing on the shaft.

3. A rotor including, a shaft, a frame on the shaft projecting radially therefrom, pole pieces at the outer peripheral portion of the frame and fixed relative thereto, a plurality of magnets in an annular series and seated outwardly against the pole pieces, and a continuous annular expansible core including a plurality of plates arranged side by side and engaged one against another and each bearing tightly in against the shaft and bearing tightly out against the magnets.

4. A rotor including, a shaft, a frame on the shaft projecting radially therefrom, pole pieces at the outer peripheral portion of the frame and fixed relative thereto, a plurality of relatively movable elements in an annular series and seated outwardly against the pole pieces, and a continuous annular expansible core tight on the shaft and seated outwardly against said elements in pressure engagement therewith, the frame including plates engaged on the shaft and spaced apart axially thereof and the said elements and core being held between the plates.

5. A rotor including, a shaft, a frame on the shaft projecting radially therefrom, pole pieces at the outer peripheral portion of the frame and fixed relative thereto, a plurality of elements in an annular series and seated outwardly against the pole pieces, and a continuous annular expansible core tight on the shaft and seated outwardly against said elements in pressure engagement therewith, the frame including plates engaged on the shaft and spaced apart axially thereof and tie rods extending between the plates and through the pole pieces, the said elements and core being held between the plates.

6. A rotor including, a shaft, a frame on the shaft projecting radially therefrom, pole pieces at the outer peripheral portion of the frame and fixed relative thereto, a plurality of elements in an annular series and seated outwardly against the pole pieces, and a continuous annular expansible core tight on the shaft and bearing inwardly thereon and seated outwardly against said elements and bearing outwardly thereon, the frame including plates engaged on the shaft and spaced apart axially thereof and outer tie rods extending between the plates and through the pole pieces and inner tie rods extending between the plates and through the core, the said elements and core being held between the plates.

7. A rotor including, a shaft, a frame on the shaft projecting radially therefrom, pole pieces at the outer peripheral portion of the frame and fixed relative thereto, a plurality of elements in an annular series and seated outwardly against the pole pieces and bearing outwardly thereon, and an expansible core tight on the shaft and seated outwardly against said elements and bearing outwardly thereon, the frame including plates engaged on the shaft and spaced apart axially thereof and outer tie rods extending between the plates and through the pole pieces and inner tie rods extending between the plates and through the core, the pole pieces having openings snugly receiving the outer tie rods and the core having openings freely passing the inner tie rods.

8. A rotor including, a shaft, a frame on the shaft projecting radially therefrom, pole pieces at the outer peripheral portion of the frame and fixed relative thereto, a plurality of elements in an annular series and seated outwardly against the pole pieces, and an expansible core tight on the shaft and seated outwardly against said elements in pressure engagement therewith, the core being a continuous annular structure with axially disposed openings in it entering it from its outer periphery and dividing it into corner portions each engaging two adjacent elements and having connecting portions between and connecting the corner portions and each with a part bearing on the shaft.

9. A rotor including, a shaft, a frame on the shaft projecting radially therefrom, pole pieces at the outer peripheral portion of the frame and fixed relative thereto, a plurality of elements in an annular series and seated outwardly against the pole pieces, and an expansible core tight on the shaft and seated outwardly against said elements, the core being a continuous annular structure with axially disposed openings in it extending into it from its outer periphery and dividing it into corner portions each engaging two adjacent elements and having bridge-shaped portions between and connecting the corner portions and each with a part bearing on the shaft.

10. A rotor including, a shaft, a frame on the shaft projecting radially therefrom, pole pieces at the outer peripheral portion of the frame and fixed relative thereto, a plurality of elements in an annular series and seated outwardly against the pole pieces and defining a polygonal opening concentric with the shaft, and a continuous annular expansible core with a polygonal exterior fitting the opening and with circumferentially spaced parts bearing inward on the shaft, the exterior of the core being divided into separate corner portions each wedged outwardly into engagement with two adjacent elements.

11. A rotor including, a shaft, a frame on the shaft projecting radially therefrom, pole pieces at the outer peripheral portion of the frame and fixed relative thereto, a plurality of magnets in an annular series and seated outwardly against the pole pieces, and an expansible core including a solid continuous annular core with portions bearing tight inward against the shaft and portions bearing tight outward against the magnets.

12. A rotor including, a shaft, a frame on the shaft projecting radially therefrom, pole pieces at the outer peripheral portion of the frame and fixed relative thereto, a plurality of elements in an annular series and seated outwardly against the pole pieces, and an expansible core tight on the shaft and seated outwardly against said elements, the frame including plates engaged on the shaft and spaced apart axially thereof and tie rods extending between the plates, the core having openings extending into it from its exterior dividing it into portions each bearing out against two adjacent elements and having circumferentially spaced parts bearing inwardly on the shaft, each opening having a slot-shaped outer portion and having a round inner portion freely passing a tie rod of the frame.

13. A continuous expansible polygonal rotor core having separated outer portions with magnet seats thereon and inner portions connecting the outer portions at the interior of the core and having shaft seats thereon, the connecting portions being deformable to cause spreading of the outer portions radially and circumferentially.

References Cited in the file of this patent

UNITED STATES PATENTS

| Number | Name | Date |
|---|---|---|
| 939,910 | Hassler | Nov. 9, 1909 |
| 1,996,946 | Beeh | Apr. 9, 1935 |
| 2,493,102 | Brainard | Jan. 3, 1950 |

FOREIGN PATENTS

| Number | Country | Date |
|---|---|---|
| 459,295 | Great Britain | Jan. 5, 1937 |
| 495,813 | Great Britain | Nov. 21, 1938 |